US012558923B2

(12) United States Patent
Schwenke et al.

(10) Patent No.: US 12,558,923 B2
(45) Date of Patent: Feb. 24, 2026

(54) COMMERCIAL VEHICLE TYRE

(71) Applicant: Continental Reifen Deutschland GmbH, Hannover (DE)

(72) Inventors: Andreas Schwenke, Isernhagen (DE); Florian Kristen, Burgwedel (DE); Helge Rother, Bruchhausen-Vilsen (DE); Chun Yi Yeo, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/687,071

(22) PCT Filed: Aug. 27, 2021

(86) PCT No.: PCT/DE2021/200115
§ 371 (c)(1),
(2) Date: Feb. 27, 2024

(87) PCT Pub. No.: WO2023/025336
PCT Pub. Date: Mar. 2, 2023

(65) Prior Publication Data
US 2024/0278602 A1 Aug. 22, 2024

(51) Int. Cl.
*B60C 11/12* (2006.01)
*B60C 11/03* (2006.01)
*B60C 11/13* (2006.01)

(52) U.S. Cl.
CPC ...... *B60C 11/0309* (2013.01); *B60C 11/1218* (2013.01); *B60C 11/125* (2013.01);
(Continued)

(58) Field of Classification Search
CPC ............... B60C 11/1218; B60C 11/125; B60C 11/1281; B60C 2011/1227
See application file for complete search history.

(56) References Cited

U.S. PATENT DOCUMENTS

| 4,598,747 A | 7/1986 | Flechtner |
| 2005/0211354 A1* | 9/2005 | Shinmura ........... B60C 11/1369 |
| | | 152/209.22 |
| 2022/0402306 A1 | 12/2022 | Haertwig et al. |

FOREIGN PATENT DOCUMENTS

| DE | 3540668 A1 | 5/1987 |
| DE | 102005058365 A1 | 6/2007 |

(Continued)

OTHER PUBLICATIONS

Machine translation for Europe 1,529,662 (Year: 2025).*

(Continued)

*Primary Examiner* — Steven D Maki
(74) *Attorney, Agent, or Firm* — Gregory Adams; Richard A. Wolf

(57) ABSTRACT

The invention relates to a commercial vehicle tire having a tread with at least one profile rib which runs in encircling fashion in a circumferential direction, is arranged laterally with respect to the tire equatorial plane and has sipes extending through it, which sipes each have sipe walls, a sipe midplane spaced apart equally from the sipe walls, a width of 0.4 mm to 2.0 mm and a maximum depth in a radial direction of at least 40% of the profile depth, wherein each sipe, at least in a portion which runs over the predominant part thereof as seen in plan view, has at least one sipe zone which is offset in relation to the radially outer sipe periphery and which runs in an extent direction of the sipe in an undulating form and in arcuate or singly serrated form in a radial direction, wherein a plane running through the point of the maximum excursion of the sipe zone has a line of intersection with the sipe midplane, which line of intersection follows the undulating form of the sipe zone.

21 Claims, 4 Drawing Sheets

View $S_3$

Level $N_7$

(52) U.S. Cl.
CPC ... *B60C 11/1281* (2013.01); *B60C 2011/1227* (2013.01); *B60C 2200/06* (2013.01)

(56)                    References Cited

FOREIGN PATENT DOCUMENTS

| | | | | | |
|---|---|---|---|---|---|
| DE | 102019211025 | A1 | | 1/2021 | |
| EP | 0125437 | B1 | | 2/1987 | |
| EP | 1529662 | A1 | * | 5/2005 | ............ B60C 11/12 |
| EP | 2159080 | B1 | | 5/2011 | |
| JP | 63-149205 | A | * | 6/1988 | |
| JP | 01-101205 | A | * | 4/1989 | |
| JP | 2001-187517 | A | * | 7/2001 | ............ B60C 11/12 |
| JP | 2002-356105 | A | * | 12/2002 | ......... B60C 11/1218 |
| WO | WO-2007/065760 | A1 | * | 6/2007 | ......... B60C 11/0304 |
| WO | 2021099032 | A1 | | 5/2021 | |

OTHER PUBLICATIONS

Machine translation for Japan 2002-356105 (Year: 2025).*
Machine translation for Japan 2001-187517 (Year: 2025).*
Machine translation for Japan 01-101205 (Year: 2025).*
Machine translation for Japan 63-149205 (Year: 2025).*
Machine translation for WO 2007-065760 (Year: 2025).*
Abstract for Japan 01-101205 (Year: 2025).*
International Search Report dated May 2, 2022 of International Application PCT/DE2021/200115 on which this application is based.
Notice of Allowance (71(3)) dated Jul. 2, 2025 of counterpart European Application 21 790 368.1.

* cited by examiner

Fig. 2: Detail Z₂

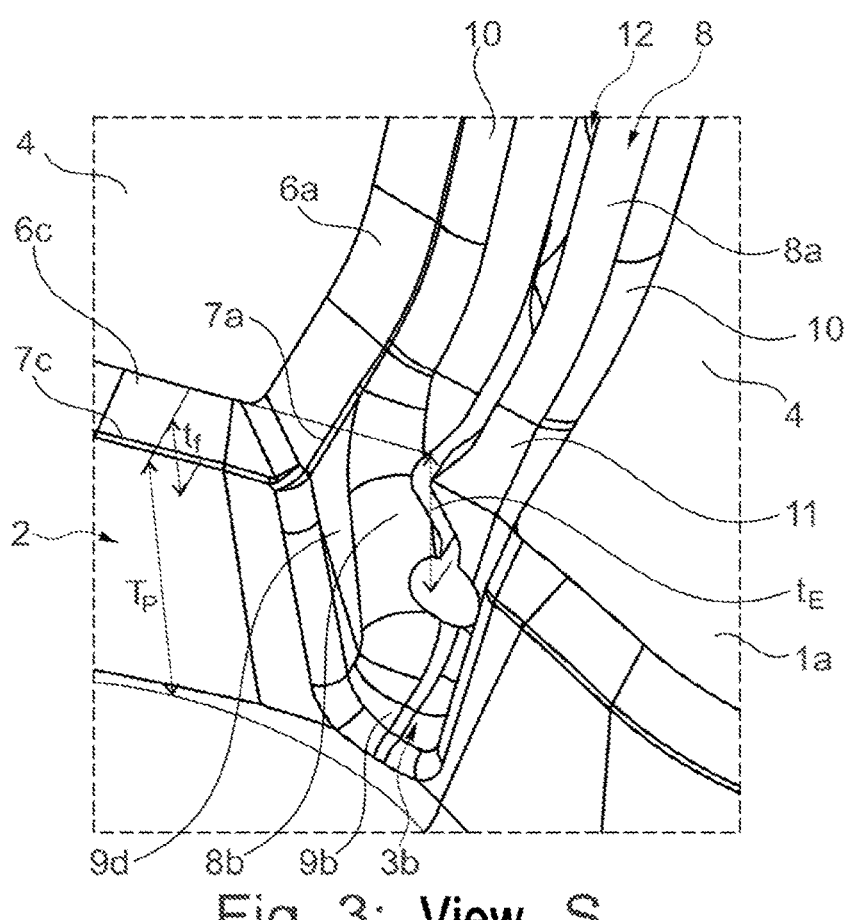
Fig. 3: View S₃
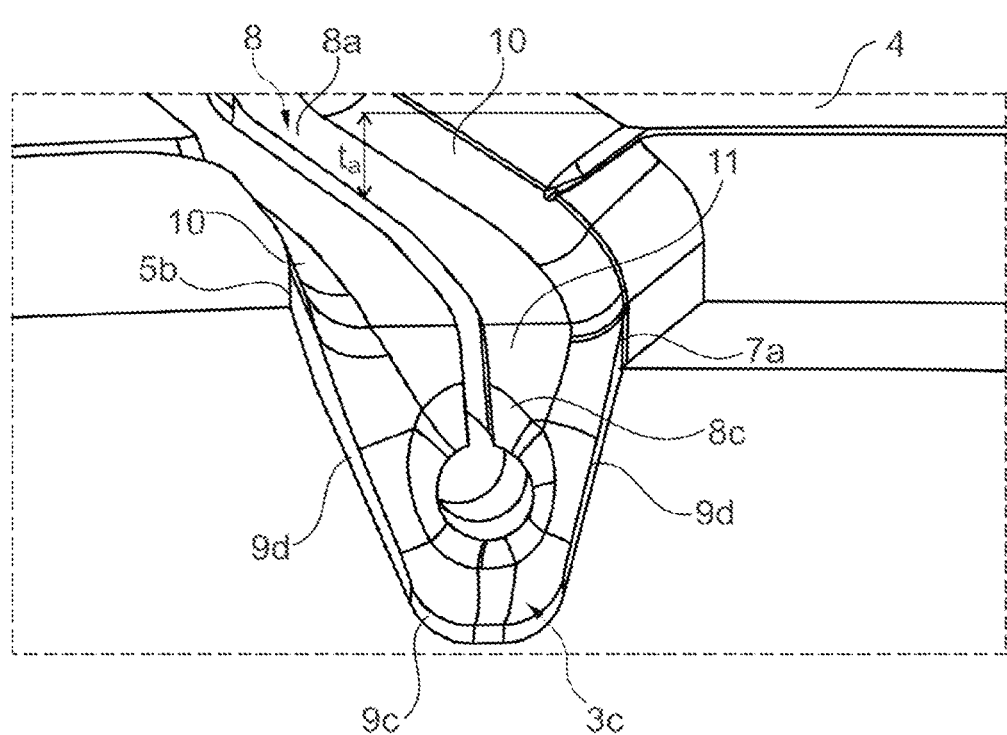
Fig. 4: View S₄

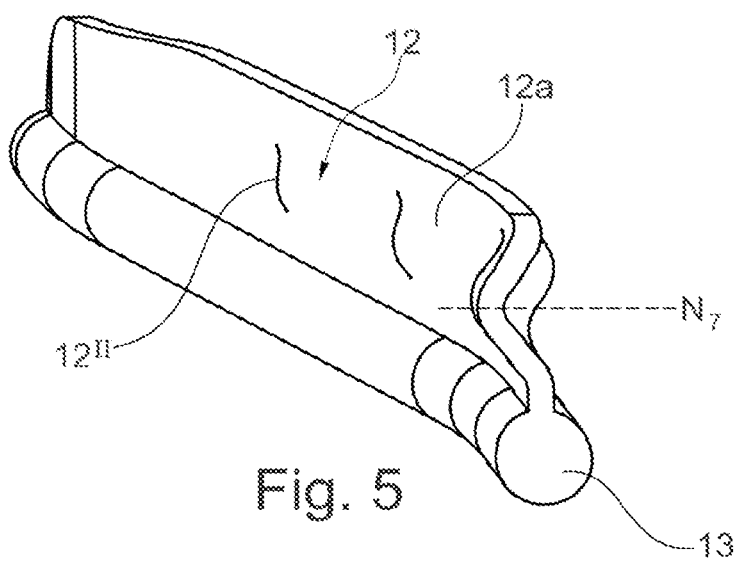
Fig. 5
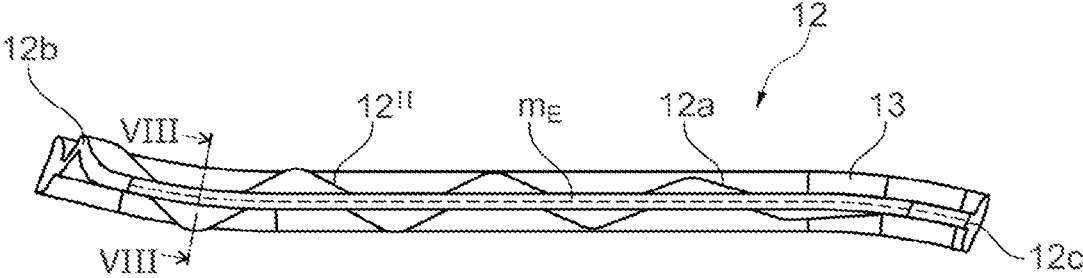
Fig. 6
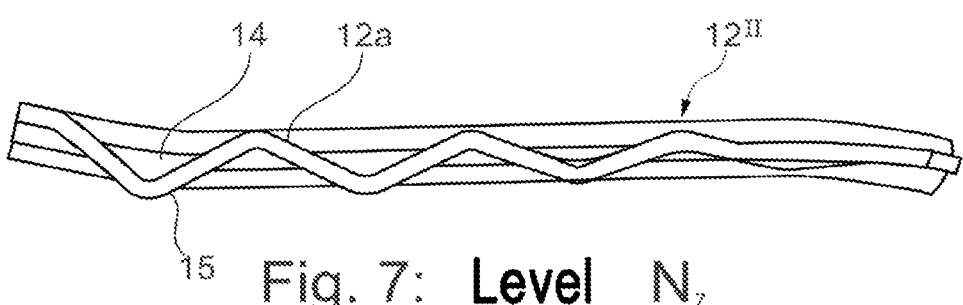
Fig. 7: Level N₇

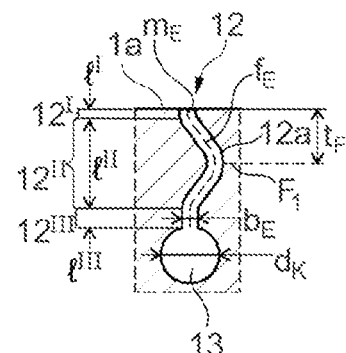
Fig. 8: Section VIII-VIII
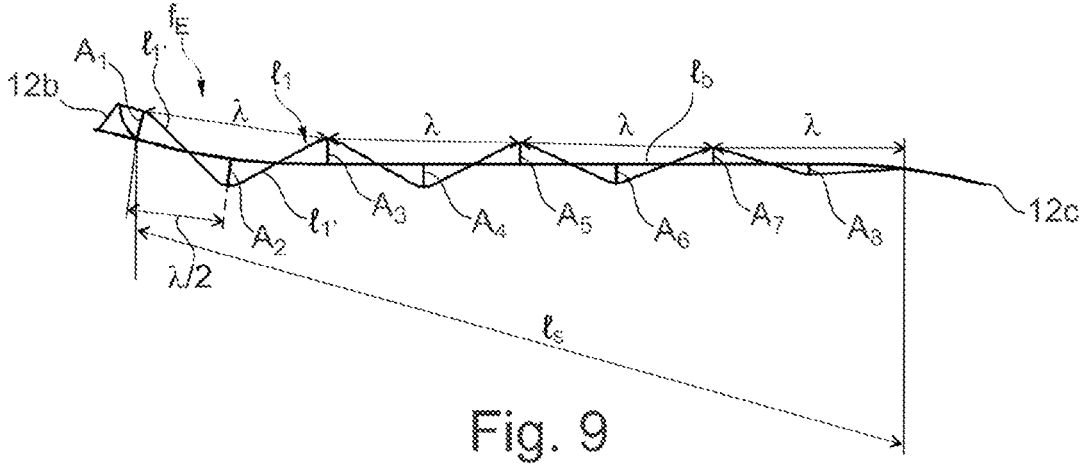
Fig. 9
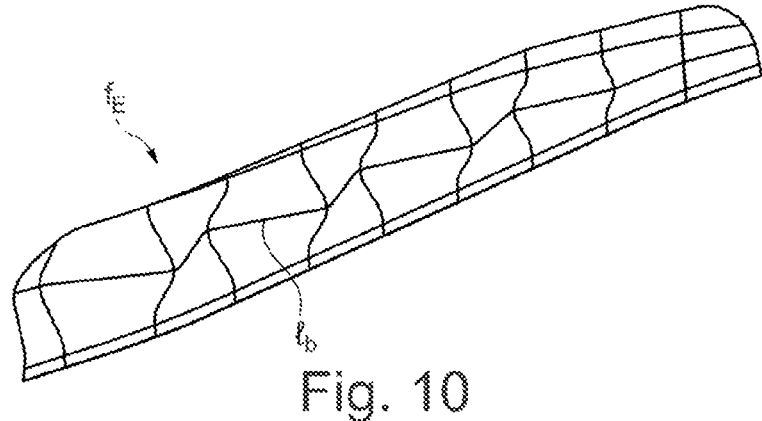
Fig. 10

COMMERCIAL VEHICLE TYRE

CROSS-REFERENCE TO RELATED APPLICATIONS

The present application is a National Stage Application under 35 U.S.C. § 371 of International Patent Application No. PCT/DE2021/200115 filed on Aug. 27, 2021, the disclosures of which are herein incorporated by reference in their entireties.

BRIEF SUMMARY

The invention relates to a commercial vehicle tire having a tread with at least one profile rib which runs in encircling fashion in a circumferential direction, is arranged laterally with respect to the tire equatorial plane and has sipes extending through it, which sipes each have sipe walls, a sipe midplane spaced apart equally from the sipe walls, a width of 0.4 mm to 2.0 mm and a maximum depth in a radial direction of at least 40% of the profile depth, wherein each sipe, at least in a portion which runs over the predominant part thereof as seen in plan view, has at least one sipe zone which is offset in relation to the radially outer sipe periphery and which runs in an extent direction of the sipe in an undulating form and in arcuate or singly serrated form in a radial direction, wherein a plane running through the point of the maximum excursion of the sipe zone has a line of intersection with the sipe midplane, which line of intersection follows the undulating form of the sipe zone.

Such a commercial vehicle tire is known for example from WO 2021/099032 A1. Said tire has a tread having a directional profiling and having middle and shoulder-side profile ribs. At least one middle profile rib is provided with sipes extending through it, which sipes have a width of 0.5 mm to 1.2 mm, and, in plan view, are each made up of a central portion and two lateral portions. The sipes extend, in plan view, in arcuate form and symmetrically with respect to the centerline of the profile rib, and have a uniform undulating form running in a radial direction, on which the undulating form present in the extent direction of the sipes is superposed only in the central portion. Multiple sipe zones are thus present, which follow one another in a radial direction and which run in arcuate or singly serrated form in the cross section of each sipe. Furthermore, each sipe has a radially outer sipe portion which proceeds from the sipe periphery and which runs in a radial direction. The sipes make it possible in particular for the rib elements formed by the sipes to be supported against one another in a stabilizing manner under load, and make it possible to achieve low and uniform tread wear.

As is known, sipes that are formed in and extend through profile ribs contribute to improving the grip characteristics of the tire. Sipes that extend through also reduce the stiffness of the particular profile rib, whereby the mobility of the profile rib is advantageously somewhat increased. The locally reduced stiffness gives rise to the risk of a non-uniform wear pattern, in particular in the case of commercial vehicle tires that are installed on the drive axle. With the previously known sipes with undulating sipe zones, it has been made possible to make the tread wear more uniform. However, in particular, commercial vehicle tires installed on drive axles remain susceptible to the occurrence of a non-uniform wear pattern.

It is therefore the object of the invention to further improve the wear pattern of a commercial vehicle tire of the type mentioned in the introduction.

Said object is achieved according to the invention in that the sipe runs in the undulating form exclusively in the sipe zone, wherein the amplitude of the line of intersection that follows the undulating form of the sipe zone decreases, in each line-of-intersection portion running over one half of a wavelength, in the direction of the tread-outside sipe end.

The specially undulating sipe zone with an altogether decreasing amplitude in the direction of the tread-outside sipe end has the effect that the mutual support effect between the rib elements formed by the sipes decreases in magnitude in the direction of the tread shoulder. As a result of the undulating sipe zone, circumferential portions of the profile rib that are situated further toward the outside of the tread are stiffened relative to one another to a lesser degree than circumferential portions that are situated further toward the inside of the tread. Therefore, in shoulder-side profile ribs, those circumferential portions which are situated closer to the tread shoulder and which have less rubber material owing to the tire contour are stiffened to a lesser degree than circumferential portions which are situated closer to the tire equatorial plane, whereby shoulder-side profile ribs having such sipes exhibit particularly uniform wear. A similar situation applies in particular to middle profile ribs arranged laterally with respect to the tire equatorial plane, where the specially undulating sipe zone in particular counteracts the varying "footprint pressure", as a result of which these profile ribs also exhibit particularly uniform wear.

In one preferred embodiment, the amplitude has a first amplitude value at the tread-inside end of each line-of-intersection portion and has a second amplitude value at the tread-outside end of each line-of-intersection portion, wherein each second amplitude value is 0.60 times to 0.95 times the associated first amplitude value. Since the line-of-intersection portions directly adjoin one another, the second amplitude value of a line-of-intersection portion is at the same time the first amplitude value of that line-of-intersection portion which adjoins the tread-outside end of the aforementioned line-of-intersection portion. This embodiment thus specifies the extent of the particularly advantageous amplitude decrease that occurs over the line-of-intersection portions.

With regard to the stiffening action of the undulating sipe zone that is advantageous for uniform wear, it is favorable if the amplitude at the tread-inside end of that line-of-intersection portion which is furthest to the inside of the tread has an amplitude value of 100% to 500%, in particular of 120% to 300%, preferably of 150% to 250%, of the width of the sipe.

In a further preferred embodiment that is advantageous for uniform wear behavior, the line of intersection that follows the undulating form of the sipe zone runs over three to six, preferably over up to five, in particular over four, wavelengths. There is therefore a corresponding number of line-of-intersection portions which each run over one half of a wavelength and over which the aforementioned amplitude decrease occurs.

In the latter preferred embodiment, one advantageous variant consists in that the wavelengths are of equal size.

The plane that runs through the point of the maximum excursion of the sipe zone preferably runs parallel to the rib outer surface of the profile rib. The "radial depth position", measured in relation to the rib outer surface, of the sipe zone is therefore constant over the longitudinal extent of said sipe zone. This allows stiffening which is advantageously uniform over the width extent, in an axial direction, of the profile rib, which likewise assists in making the wear pattern more uniform.

A further preferred embodiment that is likewise advantageous for uniform wear behavior is characterized in that the plane that runs through the point of the maximum excursion of the sipe zone is a plane of symmetry of the sipe zone.

In a further preferred embodiment, the plane that runs through the point of the maximum excursion of the sipe zone runs, at least over the predominant part of its extent, at a constant depth, measured in a radial direction, of 45% to 65%, in particular of 50% to 60%, of the maximum depth of the sipe. A sipe zone positioned in this way maintains its advantageous effect with progressively increasing tread wear.

It is furthermore preferable if the line of intersection that follows the undulating form of the sipe zone runs in the form of a zigzag-shaped undulation.

A further preferred embodiment is characterized in that, as viewed in a cross section of the sipe, the sipe zone has a length, based on the sipe midplane and measured in a radial direction, of 30% to 90%, in particular of 35% to 80%, of the maximum depth of the sipe.

In a further preferred embodiment, the sipe has a radially outer sipe portion which runs in a straight manner between the sipe zone and the sipe periphery and in the cross section of the sipe and which has a length, based on the sipe midplane, of preferably 0.5 mm to 1.5 mm. The sipe zone is thus correspondingly offset in relation to the sipe periphery.

In a further preferred variant, the sipe has a radially inner sipe portion which adjoins the sipe zone and which runs in a straight manner in the cross section of the sipe and which has a length, based on the sipe midplane, of preferably 0.5 mm to 1.5 mm.

A further preferred embodiment is characterized in that the sipes include sipes a) which proceed from the rib outer surface of the profile rib and/or b) which are each situated in a profile rib web which belongs to the profile rib and which is formed in a transverse channel extending through the profile rib, wherein the profile rib web extends over the predominant part of the transverse channel and has a top surface which, in relation to the rib outer surface of the profile rib, preferably runs at a depth, measured at the lowest point(s) of said top surface in a radial direction, of 1.0 mm to 10.0 mm, in particular of 2.0 mm to 5.0 mm, and/or c) which each proceed from the base of a depression extending through the profile rib, wherein the depression has a depth of 1.0 mm to 10.0 mm, preferably of 2.0 mm to 4.0 mm, in a radial direction in relation to the rib outer surface of the profile rib.

For the expulsion of water from the profile rib, it is advantageous if sipes are provided which each, over their entire extent, open into a channel which is formed in the interior of the profile rib and which has a diameter of 200% to 600%, in particular of 300% to 500%, preferably of 350% to 450%, of the width of the sipe.

The sipes designed according to the invention have a particularly favourable effect in shoulder-side profile ribs, and therefore a further preferred embodiment is characterized in that the profile rib is a shoulder-side profile rib.

BRIEF DESCRIPTION OF THE DRAWINGS

Further features, advantages and details of the invention will now be described in more detail with reference to the drawing, which schematically illustrates an exemplary embodiment of the invention. In the drawing:

FIG. 2 shows an enlarged plan view of the detail $Z_2$ in FIG. 1, FIG. 3 shows a view in the viewing direction indicated in FIG. 2 by the arrow $S_3$, FIG. 4 shows a view in the viewing direction indicated in FIG. 2 by the arrow $S_4$, FIG. 5 shows a visualization of a sipe in an oblique view, FIG. 6 shows a visualization of the sipe from FIG. 5 in a plan view, FIG. 7 shows a visualization of the sipe from FIG. 5 in a plan view, with the tread having been worn away to the level $N_7$ indicated in FIG. 5, FIG. 8 shows a section along the line VIII-VIII in FIG. 6, FIG. 9 shows a plan view of a visualized sipe midplane belonging to the sipe from FIG. 5 to FIG. 8, and FIG. 10 shows an oblique view of the visualized sipe midplane from FIG. 9.

DETAILED DESCRIPTION

Figure 1:
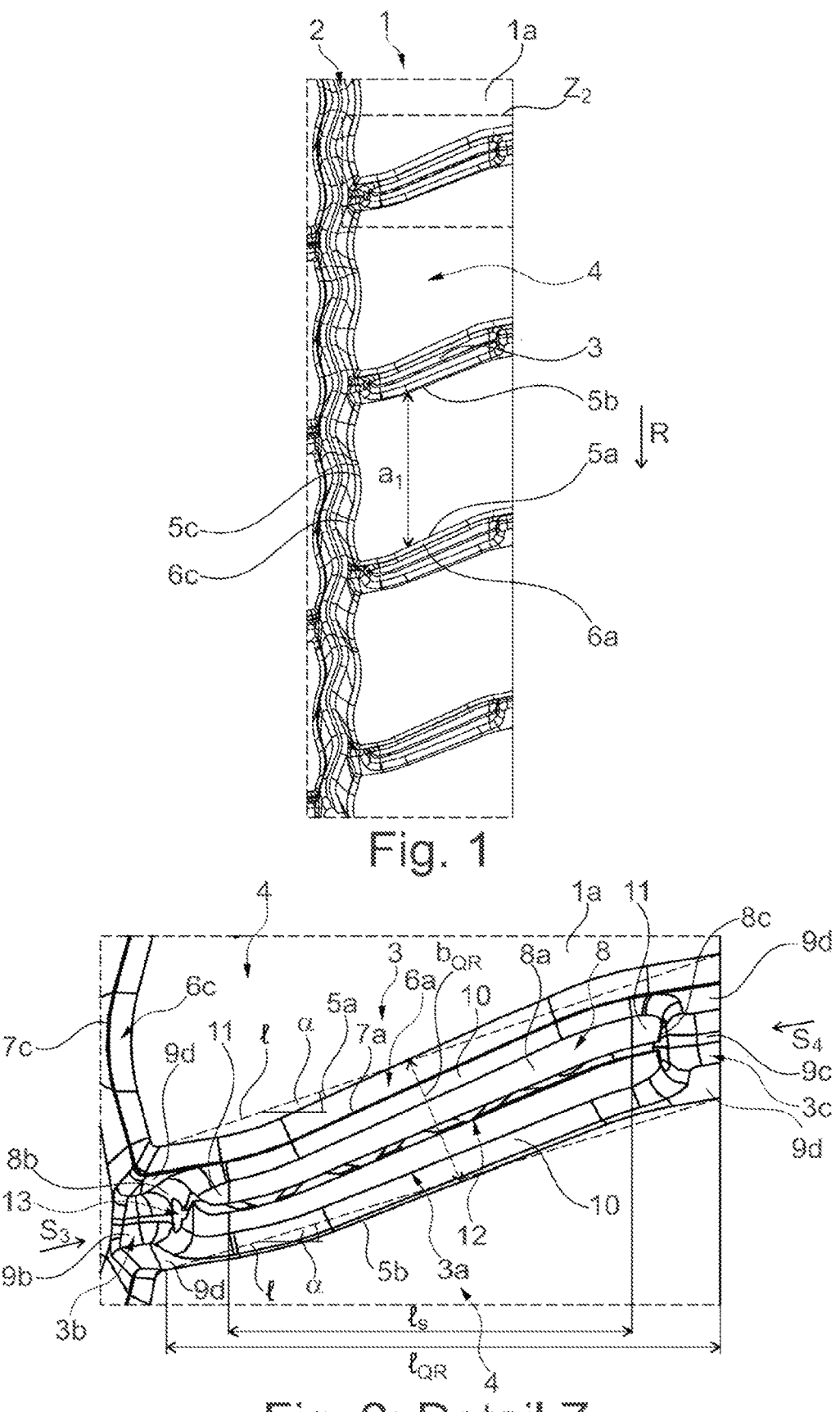
FIG. 1 shows a plan view of a circumferential portion of a shoulder-side profile rib of a tread of a commercial vehicle tire, having a design variant of the invention.

Commercial vehicle tires designed according to the invention are tires for multi-track commercial vehicles, preferably for medium-weight trucks (7.5 t<gross vehicle weight≤18.0 t) or for heavy trucks (gross vehicle weight>18.0 t), and in particular commercial vehicle tires of radial construction. The commercial vehicle tires according to the invention are preferably installed on the drive axle.

FIG. 1 shows a plan view of a circumferential portion of a shoulder-side profile rib 1 of a tread of a commercial vehicle tire. A second shoulder-side profile rib, which is mirror-symmetrical with respect to the shoulder-side profile rib 1 in relation to the tire equatorial plane, is preferably formed in the second tread shoulder. The tread preferably has a directional profiling, which is intended for being installed on a commercial vehicle so as to have the rolling direction indicated in FIG. 1 by the arrow R during forward travel.

The shoulder-side profile rib 1 is delimited toward the inside of the tread by a shoulder-side circumferential channel 2, which in the exemplary embodiment shown runs in undulating fashion as seen in plan view and which, in a radial direction, is formed with the respectively provided profile depth $T_P$ (indicated in FIG. 3), normally of 12.0 mm to 26.0 mm. In the case of treads with circumferential channels of different depths, the expression "profile depth" refers to the depth of the deepest circumferential channel(s).

The shoulder-side profile rib 1 has a rib outer surface 1a situated at the tread periphery and is equipped with a multiplicity of shoulder-side transverse channels 3 which are distributed over the tread circumference, which run parallel to one another as seen in plan view, which are inclined relative to the axial direction and which extend through the shoulder-side profile rib 1 such that said profile rib exhibits rib elements 4. At the rib outer surface 1a, each rib element 4 has a leading edge 5a at one adjoining transverse channel 3, said leading edge entering the ground contact patch first as the tire rolls during forward travel (arrow R), has a trailing edge 5b at the other adjoining transverse channel 3, and has an edge Sc at the circumferential channel 2. As seen in plan view, the edges 5a, 5b run substantially parallel to one another, each with a scarcely perceptible S-shaped curvature, and, based on a line 1 (FIG. 2) which connects the ends of the particular edge 5a, 5b and which is straight in plan view, at an angle $\alpha$ (FIG. 2) relative to the axial direction of 10° to 25°, in particular of 13° to 20°, wherein the angle $\alpha$ of the edge $5a$ differs from the angle $\alpha$ of the edge $5b$ by at most 3, in particular by at most 1°. Shoulder-side transverse channels 3 that directly follow one another in a circumferential direction have spacings $a_1$ to one another of preferably 20.0 mm to 80.0 mm, in particular of 30.0 mm to 70.0 mm, based on the edges $5a$, $5b$ and measured in the circumferential direction.

In the exemplary embodiment shown, a bevel $6a$ proceeds from the edge $5a$ and a bevel $6c$ proceeds from the edge Sc, wherein, as viewed in a cross section perpendicular to the associated edge $5a$, Sc, the bevels $6a$, $6c$ appear as straight lines and run at an angle of preferably 30° to 55° with respect to the radial direction, and said bevels furthermore each extend in a radial direction to a depth $t_f$ (FIG. 3) of in particular up to 3.0 mm and each have a bevel edge $7a$ (bevel $6a$: FIG. 2 and FIG. 3), $7c$ (bevel $6c$: FIG. 2 and FIG. 3) that runs at the depth $t_f$.

The further configuration of the shoulder-side transverse channels 3 will be discussed below with reference to a single shoulder-side transverse channel 3.

As shown in FIG. 2, the shoulder-side transverse channel 3 has a scarcely perceptible S-shaped curvature as seen in plan view, similarly to the edges $5a$, $5b$. The transverse channel 3 has a width $b_{QR}$, measured as a smallest possible spacing between the edges $5a$, $5b$, of 6.0 mm to 12.0 mm, said width either being constant over the extent of the edges $5a$, $5b$ or varying by at most 2.0 mm, and a length $l_{QR}$ projected in the axial direction and based on the edges $5a$, $5b$, specifically on the longer of the two edges $5a$, $5b$ in the case of edges $5a$, $5b$ of different lengths.

A profile rib web 8 (cf. FIG. 3 and FIG. 4) is formed in the transverse channel 3, which profile rib web 8 is spaced apart from the ends of the transverse channel 3, extends over the predominant part of the length $l_{QR}$ of the transverse channel 3, extends to the rib elements 4, and is offset in a radial direction in relation to the rib outer surface $1a$, such that the transverse channel 3, as seen in plan view, is made up of a central channel main portion $3a$, which runs on the profile rib web 8, a channel mouth portion $3b$ adjoining the tread-inside end of the profile rib web 8, and a channel shoulder portion $3c$ adjoining the tread-outside end of the profile rib web 8.

The channel mouth portion $3b$ and the channel shoulder portion $3c$ are, as seen in cross section, each delimited by a base $9b$ (channel mouth portion $3b$, cf. FIG. 3), $9c$ (channel shoulder portion $3c$, cf. FIG. 4) and by flanks $9d$ (cf. FIG. 3 and FIG. 4) formed on the rib elements 4, with in each case one flank $9d$ running to the bevel edge $7a$ (FIG. 2 to FIG. 4) and the other flank $9d$ running to the trailing edge $5b$ (FIG. 2 and FIG. 4).

As is also shown in FIG. 2, the profile rib web 8 is delimited in a radial direction by a top surface $8a$ running parallel to the rib outer surface $1a$, toward the channel mouth portion $3b$ by a tread-inside side flank $8b$ (see FIG. 3) running in the direction of the base $9b$, and toward the channel shoulder portion $3c$ by a tread-outside side flank $8c$ (cf. FIG. 4) running in the direction of the base $9c$. The top surface $8a$ runs, in relation to the rib outer surface $1a$ (FIG. 4), at a depth $t_a$, measured at the lowest point(s) of said top surface in a radial direction, of 1.0 mm to 10.0 mm, in particular of 2.0 mm to 5.0 mm. The side flanks $8b$, $8c$ run in a radial direction or at an angle of up to 3° relative to the radial direction, and in the exemplary embodiment shown are surfaces which have a slight curvature over their entire extent and which indent the end regions of the profile rib web 8 and which transition continuously (without sharp angles) into the flanks $9d$ of the channel mouth portion $3b$ and the flanks $9d$ of the channel shoulder portion $3c$ (FIG. 2 to FIG. 4) respectively. Furthermore, in the exemplary embodiment shown, between the top surface $8a$ and each adjoining rib element 4, there is formed a rounded transition portion 10 (FIG. 2 to FIG. 4) which extends from the tread-inside side flank $8b$ (FIG. 3) to the tread-outside side flank $8c$ (FIG. 4) and adjoins these in continuous fashion (without sharp angles). Further rounded transition portions 11 (FIG. 2 to FIG. 4) are formed between the ends of the top surface $8a$ and the side flanks $8b$, $8c$.

As per FIG. 2, the profile rib web 8 has a length $l_S$, based on the furthest spaced-apart ends of its top surface $8a$ and projected in the axial direction, of 50% to 80%, in particular of 65% to 75%, of the length $l_{QR}$ of the transverse channel 3, and is provided with a sipe 12 which proceeds from the center of the top surface $8a$, which runs in a radial direction into the interior of the profile rib web 8, which extends through the profile rib web 8 over the longitudinal extent thereof, and which in the exemplary embodiment opens, over its entire extent, into a tubular channel 13 (cf. FIG. 5) formed in the interior of the profile rib web 8. Both the sipe 12 and the channel 13 therefore emerge from the profile rib web 8 at the side flanks $8b$, $8c$, with the sipe 12 furthermore emerging at the rounded transition portions 11.

As shown in FIG. 5, FIG. 6 and FIG. 8, the sipe 12 has two mutually opposite sipe walls $12a$ and a constant width $b_E$ (FIG. 8), measured between and perpendicular to the sipe walls $12a$, of 0.4 mm to 2.0 mm, in particular of up to 1.2 mm, preferably of up to 0.8 mm, and, over the predominant part of its extent, extends in a radial direction to a maximum depth $t_E$ (FIG. 3, depth at the lowest point), measured in relation to the level of the rib outer surface $1a$, of 40% to 90%, in particular of 50% to 80%, of the profile depth $T_P$ (FIG. 3). The sipe 12 becomes narrower in the direction of the tread shoulder, in a manner known per se.

The sipe 12 has a sipe centerline $m_E$ (FIG. 6), which as seen in plan view follows the sipe profile present at the top surface $8a$, a sipe midplane $f_E$ (FIG. 8), which proceeds from said sipe centerline and which is spaced apart equally from the sipe walls $12a$, a tread-inside sipe end $12b$ (FIG. 6) and a tread-outside sipe end $12c$ (FIG. 6), and, as seen in cross section as shown in FIG. 8, said sipe is made up in a radial direction of a radially outer sipe portion $12'$ (scarcely visible in FIG. 8), a middle sipe zone $12''$ which runs in arcuate or singly serrated form (that is to say in the present case in a V shape), and a radially inner sipe portion $12'''$.

The radially outer sipe portion $12'$ and the radially inner sipe portion $12'''$ run in a radial direction and as a continuation of one another (in alignment), and have respective lengths $l'$ (sipe portion $12'$) and $l'''$ (sipe portion $12'''$), based on the sipe midplane $f_E$ and measured in a radial direction, of preferably 0.5 mm to 1.5 mm in each case.

The middle sipe zone $12''$ is thus offset in a radial direction relative to the level of the radially outer sipe periphery that is present at the top surface $8a$ (level of the sipe edges), that is to say into the interior of the profile rib web 8. The middle sipe zone $12''$ runs in an extent direction of the sipe 12 in an undulating form (FIG. 6) and has a length $l''$ (FIG. 8), based on the sipe midplane $f_E$ and measured in a radial direction, of 30% to 90%, in particular of 35% to 80%, of the maximum depth $t_E$ (FIG. 3). In the direction of the outside of the tread, the length $l''$ preferably decreases by 10% to 30% in relation to its particular maximum value (cf. FIG. 10).

As can be seen from FIG. 8 in particular in combination with FIG. 5, the middle sipe zone 12" furthermore has a plane of symmetry $F_1$ (indicated in FIG. 5 by the level $N_7$), which is oriented parallel to the rib outer surface $1a$ and which runs through the point of the maximum excursion of the middle sipe zone 12" and, at least over the predominant part of its extent, at a constant depth $t_F$ (FIG. 8), measured in a radial direction, of 45% to 65%, in particular of 50% to 60%, of the maximum depth $t_E$(FIG. 3). The point of the maximum excursion of the middle sipe zone 12" is defined by that point of the sipe midplane $f_E$ which has the greatest excursion in relation to the sipe centerline $m_E$ as seen in the cross section which, in plan view, is oriented perpendicular to the sipe centerline $m_E$.

FIG. 9 and FIG. 10 each show the sipe midplane $f_E$ of the sipe 12. In FIG. 9, the sipe midplane $f_E$ has a line of intersection $l_1$ with the plane of symmetry $F_1$ (FIG. 8), which line of intersection, as seen in plan view, runs in a zigzag-shaped undulation over the aforementioned length $l_S$ (cf. FIG. 2), projected in the axial direction, of the profile rib web 8. The line of intersection $l_1$ thus follows the undulating form of the middle sipe zone 12". As shown in FIG. 7, the middle sipe zone 12" is thus formed by shallow pyramid-shaped projections 14, which are formed correspondingly alternately on the sipe walls $12a$ and each have a rectangular, in particular square, base lying on the particular sipe wall $12a$ (cf. the visualization in FIG. 10), and depressions 15 which are situated opposite, and correspond with, the projections 14.

The profile of the line of intersection $l_1$ will hereinafter be discussed with the aid of an undulation baseline $l_b$ (FIG. 9) that runs in the plane of symmetry $F_1$. The undulation baseline $l_b$ is obtained by projecting the sipe centerline $m_E$ (FIG. 6) into the plane of symmetry $F_1$ (FIG. 8) and is the line in relation to which the amplitude of the undulation is measured in a known manner. As per FIG. 9, the line of intersection $l_1$ running in undulating fashion extends over three to six, preferably over up to five, in the exemplary embodiment over four, wavelengths $\lambda$, which in the exemplary embodiment are of equal size. Furthermore, the line of intersection $l_1$ running in undulating fashion has a varying amplitude which decreases, over each line-of-intersection portion $l_1'$ (two of these are labeled in FIG. 9) running over one half of a wavelength $\lambda/2$, in the direction of the tread-outside sipe end $12c$. The decrease in amplitude thus takes place in each case from the tread-inside end of a line-of-intersection portion $l_1'$, which is situated closer to the tread-inside sipe end $12b$, to the tread-outside end of said line-of-intersection portion $l_1'$, which is situated closer to the tread-outside sipe end $12c$. At the tread-inside end of that line-of-intersection portion $l_1'$ which is furthest to the inside of the tread, the amplitude has an amplitude value $A_1$. At the tread-outside end of that line-of-intersection portion $l_1'$ which is furthest to the inside of the tread, the amplitude has an amplitude value $A_2$ ($A_2 < A_1$), which is thus also simultaneously present at the tread-outside end of the next line-of-intersection portion $l_1'$. This decrease in amplitude progresses over the further line-of-intersection portions $l_1'$, such that, in the exemplary embodiment, the amplitude has the following amplitude values in succession proceeding from the tread-inside end of that line-of-intersection portion $l_1'$ which is furthest to the inside of the tread to the tread-outside end of that line-of-intersection portion $l_1'$ which is furthest to the outside of the tread: $A_1$-$A_2$-$A_3$-$A_4$-$A_5$-$A_6$-$A_7$-$A_8$. The amplitude value $A_1$ is 100% to 500%, in particular 120% to 300%, preferably 150% to 250%, of the width $b_E$ (FIG. 8) of the sipe 12. For the further amplitude values $A_{i+1}$, the following applies: $A_{i+1}=A_i*0.60$ to $A_i*0.95$ (in the exemplary embodiment, i=1 to 7). It is thus for example the case that the amplitude value $A_2$ is 60% to 95% of the amplitude value $A_1$, and the amplitude value $A_3$ is 60% to 95% of the amplitude value $A_2$.

As per FIG. 8, the aforementioned channel 13 has a circular cross section with a diameter $d_K$ of 200% to 600%, in particular of 300% to 500%, preferably of 350% to 450%, of the width $b_E$ of the sipe 12, and is designed such that the sipe 12, over its entire extent, opens centrally into said channel (FIG. 6), such that the channel 13 has a channel axis running through its center and parallel to the sipe centerline $m_E$(FIG. 6).

The invention is not limited to the exemplary embodiment described.

The channel 13 is optional. The tread may also be of non-directional design.

The sipes 12 run at an angle of 0° to 50° with respect to the axial direction and may have a straight, arcuate or curved profile as seen in plan view. In the case of sipes 12 which run in straight fashion as seen in plan view, the angle relates to the sipe centerline; otherwise, the angle relates to a line which is straight in plan view and which connects the ends of the sipe centerline. The sipes 12 are situated in at least a profile rib which is formed laterally with respect to the tire equatorial plane and which runs in encircling fashion in a circumferential direction (not in a central profile rib that is bisected by the tire equatorial plane). Here, the sipes 12 may proceed in each case directly from the rib outer surface $1a$, in each case from a base of a shallow depression which is formed in the profile rib and which is open to the tread periphery and which has a depth, measured at the lowest point(s) of said depression in a radial direction, of 1.0 mm to 10.0 mm, preferably of 2.0 mm to 5.0 mm, or from a profile rib web situated in a transverse channel, wherein the sipes extend through the profile rib or through the profile rib webs belonging to said profile rib. The aforementioned variants may also be combined with one another as desired. The sipe zones are provided at least in a portion of the sipe that runs over the predominant part of the sipe. The form of the undulation that is present in the extent direction of the sipe in the sipe zone may vary, such that the form of the undulation is, as described, a zigzag-shaped undulation, alternatively a sawtooth-shaped undulation, or a rounded undulation, for example a sinusoidal undulation.

LIST OF REFERENCE DESIGNATIONS

1 . . . Shoulder-side profile rib
$1a$ . . . Rib outer surface
2 . . . Shoulder-side circumferential channel
3 . . . Shoulder-side transverse channel
$3a$ . . . Central channel main portion
$3b$ . . . Channel mouth portion
$3c$ . . . Channel shoulder portion
4 . . . Rib element
$5a$ . . . Leading edge
$5b$ . . . Trailing edge
$5c$ . . . Edge
$6a$ . . . Bevel
$6c$ . . . Bevel
$7a$ . . . Bevel edge
$7c$ . . . Bevel edge
8 . . . Profile rib web
$8a$ . . . Top surface
$8b$ . . . Tread-inside side flank
$8c$ . . . Tread-outside side flank 9b . . . Base
9c . . . Base
9d . . . Flank
10 . . . Rounded transition portion
11 . . . Rounded transition portion
12 . . . Sipe
12a . . . Sipe wall
12b . . . Tread-inside sipe end
12c . . . Tread-outside sipe end
12' . . . Radially outer sipe portion
12" . . . Middle sipe zone
12''' . . . Radially inner sipe portion
13 . . . Channel
14 . . . Projection
15 . . . Depression
$a_1$ . . . Spacing
$A_{i,\ i=1\ to\ 8}$ . . . Amplitude value
$b_E$, $b_{QR}$ . . . Width
$d_K$ . . . Diameter
$f_E$ . . . Sipe midplane
$F_1$ . . . Plane of symmetry
l . . . Line
$l_1$ . . . Line of intersection
$l_1'$ . . . Line-of-intersection portion
$l_b$ . . . Undulation baseline
$l_S$, $l_{QR}$, l', l", l''' . . . Length
$m_E$ . . . Sipe centerline
$N_7$ . . . Level
R . . . Arrow (rolling direction)
$S_3$, $S_4$ . . . Arrow (viewing direction)
$t_a$, $t_E$, $t_f$, $t_F$ . . . Depth
$T_P$ . . . Profile depth
$Z_2$ . . . Detail
$\alpha$ . . . Angle
$\lambda$ . . . Wavelength
The invention claimed is:

1. A commercial vehicle tire comprising:
a shoulder side profile rib that runs in encircling fashion in a circumferential direction, is arranged laterally with respect to a tire equatorial plane and has a plurality of sipes extending through it;
the sipes each have sipe walls, a sipe midplane spaced apart equally from the sipe walls, a width ($b_E$) of 0.4 mm to 2.0 mm and a maximum depth ($t_E$) in a radial direction;
the maximum depth is at least 40% of a profile depth ($T_P$);
each sipe of the plurality of sipes has at least one sipe zone which is offset in relation to the radially outer sipe periphery and which runs in an extent direction of the sipe in an undulating form and in arcuate or singly serrated form in a radial direction;
a plane ($F_1$) runs through a point of the maximum excursion of the sipe zone and has a line of intersection ($l_1$) with a sipe midplane ($f_E$), the line of intersection follows the undulating form of the sipe zone;
wherein a sipe of the plurality of sipes runs in the undulating form exclusively in the sipe zone, wherein the amplitude of the line of intersection (l) that follows the undulating form of the sipe zone decreases, in each line-of-intersection portion running over one half of a wavelength ($\lambda/2$), in the direction of a tread-outside sipe end; and
one or more of the plurality of sipes are each situated in a profile rib web of the shoulder profile rib and which is formed in a transverse channel, wherein the profile rib web extends over a predominant part of the transverse channel.

2. The tire of claim 1, wherein the amplitude has a first amplitude value ($A_i$) at the tread-inside end of each line-of-intersection portion ($l_1'$) and has a second amplitude value ($A_{i+1}$) at the tread-outside end of each line-of-intersection portion ($l_1'$), wherein each second amplitude value ($A_{i+1}$) is 0.60 times to 0.95 times the associated first amplitude value ($A_i$).

3. The tire of claim 1, wherein the amplitude ($A_1$) at the tread-inside end of that line-of-intersection portion ($l_1'$) which is furthest to the inside of the tread has an amplitude value ($A_1$) of 100% to 500% of the width ($b_E$) of the sipe (12).

4. The tire of claim 1, wherein the line of intersection ($l_1$) that follows the undulating form of the sipe zone ($12''$) runs over three to six wavelengths ($\lambda$).

5. The tire of claim 1, wherein the wavelengths ($\lambda$) are of equal size.

6. The tire of claim 1, wherein the plane ($F_1$) that runs through the point of the maximum excursion of the sipe zone ($12''$) runs parallel to the rib outer surface ($1a$) of the profile rib (1).

7. The tire of claim 1, wherein the plane ($F_1$) that runs through the point of the maximum excursion of the sipe zone ($12''$) is a plane of symmetry ($F_1$) of the sipe zone ($12''$).

8. The tire of claim 1, wherein the plane ($F_1$) that runs through the point of the maximum excursion of the sipe zone runs, at least over the predominant part of its extent, at a constant depth, measured in a radial direction, of 45% to 65% of the maximum depth ($t_E$) of the sipe (12).

9. The tire of claim 1, wherein the line of intersection ($l_1$) that follows the undulating form of the sipe zone ($12''$) runs in the form of a zigzag-shaped undulation.

10. The tire of claim 1, wherein as viewed in a cross section of the sipe (12), the sipe zone ($12''$) has a length ($l''$), based on the sipe midplane ($f_E$) and measured in a radial direction, of 30% to 90% of the maximum depth ($t_E$) of the sipe (12).

11. The tire of claim 1, wherein the sipe (12) has a radially outer sipe portion ($12^I$) which runs in a straight manner between the sipe zone ($12''$) and the sipe periphery and in the cross section of the sipe (12) and which has a length ($l^I$), based on the sipe midplane ($f_E$).

12. The tire of claim 1, wherein the sipe (12) has a radially inner sipe portion ($12^{III}$) which adjoins the sipe zone ($12''$) and which runs in a straight manner in the cross section of the sipe (12) and which has a length ($l^{III}$), based on the sipe midplane ($f_E$), of 0.5 mm to 1.5 mm.

13. The tire of claim 1, wherein the sipes (12) include sipes (12)
a) which proceed from the rib outer surface ($1a$) of the profile rib (1) and/or
b) which are each situated in a profile rib web (8) which belongs to the profile rib (1) and which is formed in a transverse channel (3) extending through the profile rib (1), wherein the profile rib web (8) extends over the predominant part of the transverse channel (3) and has a top surface ($8a$) which, in relation to the rib outer surface ($1a$) of the profile rib (1), runs at a depth (ta), measured at the lowest point(s) of said top surface in a radial direction, of 1.0 mm to 10.0 mm, and/or
c) which each proceed from the base of a depression extending through the profile rib (1), wherein the depression has a depth of 1.0 mm to 10.0 mm, in a radial direction in relation to the rib outer surface ($1a$) of the profile rib (1).

14. The tire of claim 1, wherein the sipes (12) are provided which each, over their entire extent, open into a channel (13)

which is formed in the interior of the profile rib (1) and which has a diameter ($d_K$) of 200% to 600% of the width ($b_E$) of the sipe (12).

15. A commercial vehicle tire comprising:

a shoulder side profile rib that runs in encircling fashion in a circumferential direction, is arranged laterally with respect to a tire equatorial plane and has a plurality of sipes extending through it;

the sipes each have sipe walls, a sipe midplane spaced apart equally from the sipe walls, a width ($b_E$) of 0.4 mm to 2.0 mm and a maximum depth ($t_E$) in a radial direction;

the maximum depth is at least 40% of a profile depth ($T_P$);

each sipe of the plurality of sipes has at least one sipe zone which is offset in relation to the radially outer sipe periphery and which runs in an extent direction of the sipe in an undulating form and in arcuate or singly serrated form in a radial direction;

a plane ($F_1$) runs through a point of the maximum excursion of the sipe zone and has a line of intersection ($l_1$) with a sipe midplane ($f_E$), the line of intersection follows the undulating form of the sipe zone;

wherein a sipe of the plurality of sipes runs in the undulating form exclusively in the sipe zone, wherein the amplitude of the line of intersection (1) that follows the undulating form of the sipe zone decreases, in each line-of-intersection portion running over one half of a wavelength ($\lambda/2$), in the direction of a tread-outside sipe end;

wherein one or more of the plurality of sipes:

proceed from a rib outer surface; and are each situated in a profile rib web of the shoulder profile rib and which is formed in a transverse channel, wherein the profile rib web extends over a predominant part of the transverse channel and has a top surface which, in relation to the rib outer surface (1$a$) of the profile rib, runs at a depth ($t_a$), measured at the lowest point(s) of said top surface in a radial direction, of 1.0 mm to 10.0 mm.

16. The tire of claim 15, wherein the one or more of the plurality of sipes each proceed from the base of a depression extending through the profile rib, wherein the depression has a depth of 1.0 mm to 10.0 mm in a radial direction in relation to the rib outer surface of the profile rib.

17. The tire of claim 15, wherein the amplitude has a first amplitude value ($A_i$) at the tread-inside end of each line-of-intersection portion and has a second amplitude value ($A_{i+1}$) at the tread-outside end of each line-of-intersection portion ($l_1'$), wherein each second amplitude value ($A_{i+1}$) is 0.60 times to 0.95 times the associated first amplitude value ($A_i$).

18. The tire of claim 15, wherein the amplitude ($A_1$) at the tread-inside end of that line-of-intersection portion which is furthest to the inside of the tread has an amplitude value ($A_1$) of 100% to 500% of the width ($b_E$) of the sipe.

19. The tire of claim 15, wherein the line of intersection that follows the undulating form of the sipe zone runs over three to six wavelengths ($\lambda$).

20. The tire of claim 15, wherein the wavelengths ($\lambda$) are of equal size.

21. The tire of claim 15, wherein the plane ($F_1$) that runs through the point of the maximum excursion of the sipe zone runs parallel to the rib outer surface of the profile rib.

* * * * *